United States Patent
Jayaraman et al.

(10) Patent No.: US 10,358,116 B1
(45) Date of Patent: Jul. 23, 2019

(54) VEHICLE SECURITY

(71) Applicant: Ford Global Technologies, LLC, Dearborn, MI (US)

(72) Inventors: Vijay Jayaraman, Novi, MI (US); Karl Nathan Clark, Belleville, MI (US); Jason Michael Miller, Woodhaven, MI (US); Mohamad Nasser, Dearborn Heights, MI (US); Ali Mohamad Suleiman, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/902,857

(22) Filed: Feb. 22, 2018

(51) Int. Cl.
| | |
|---|---|
| *B60R 25/30* | (2013.01) |
| *H04L 29/06* | (2006.01) |
| *H04L 29/08* | (2006.01) |
| *B60R 25/102* | (2013.01) |

(52) U.S. Cl.
CPC .......... *B60R 25/307* (2013.01); *B60R 25/102* (2013.01); *H04L 63/1416* (2013.01); *H04L 67/306* (2013.01); *B60W 2540/28* (2013.01)

(58) Field of Classification Search
CPC . B60R 25/307; B60R 25/102; H04L 63/1416; H04L 67/306; B60W 2540/28
USPC .... 340/426.13, 425.5, 539.1, 539.11, 539.13
See application file for complete search history.

(56) References Cited

U.S. PATENT DOCUMENTS

| | | | |
|---|---|---|---|
| 7,312,691 B2 | 12/2007 | Zambo et al. | |
| 8,943,187 B1 | 1/2015 | Saylor | |
| 9,118,670 B2 | 8/2015 | Martin | |
| 9,319,477 B2* | 4/2016 | Angus | H04L 67/2814 |
| 2004/0083031 A1* | 4/2004 | Okezie | A61B 5/145 |
| | | | 701/1 |
| 2008/0048844 A1* | 2/2008 | Watanabe | B60R 25/00 |
| | | | 340/425.5 |
| 2012/0089684 A1* | 4/2012 | Angus | H04L 47/22 |
| | | | 709/206 |
| 2013/0124009 A1 | 5/2013 | Esler | |
| 2013/0144715 A1 | 6/2013 | Kranzley et al. | |
| 2015/0258969 A1* | 9/2015 | Crane | B60S 1/0433 |
| | | | 15/250.201 |
| 2017/0144671 A1* | 5/2017 | Memani | B60W 40/09 |

* cited by examiner

*Primary Examiner* — Daryl C Pope
(74) *Attorney, Agent, or Firm* — Frank Lollo; Brooks Kushman P.C.

(57) ABSTRACT

Systems and methods for managing vehicle security include a server that, responsive to receiving a remote command for a vehicle from an authorized mobile device, transmits the command to the vehicle. The vehicle responsively executes the command. The server also monitors third-party Internet data for security risks. Responsive to identifying a security risk for the vehicle based on the monitored third-party Internet data after the command is executed, the server deauthorizes the mobile device from remotely commanding the vehicle.

18 Claims, 3 Drawing Sheets

VEHICLE SECURITY

TECHNICAL FIELD

Aspects of the disclosure generally relate to vehicle security.

BACKGROUND

Technical improvements in the automotive field have made vehicles increasingly susceptible to security breaches.

SUMMARY

In an exemplary embodiment, a system includes a server configured to, responsive to receiving a remote command for a vehicle from an authorized mobile device, transmit the command to the vehicle. The vehicle is configured to execute the command in response to receiving the command. The server is further configured to identify a security risk for the vehicle based on monitored third-party Internet data. Responsive to identifying a security risk for the vehicle after the command is executed, the server is configured to deauthorize the mobile device from remotely commanding the vehicle.

In another exemplary embodiment, a system includes a vehicle configured to, responsive to a vehicle power-on event, automatically form a local wireless connection with a mobile device based on authorization data stored in the vehicle. The vehicle is further configured to, responsive to receiving a clean-up signal from a server transmitted responsive to the server identifying a security risk associated with the vehicle based on monitored third-party Internet data, deauthorize automatic connection with the mobile device by clearing the authorization data.

In a further exemplary embodiment, a method includes subscribing a server to a third-party Internet source of security risk indicators for a plurality of vehicle identification numbers (VINs). The method further includes, responsive to receiving a remote command for a vehicle including one of the VINs from an authorized mobile device, causing, by the server, the vehicle to execute the command. The method also includes, responsive to receiving a security risk indicator for the VIN via the subscription, deauthorizing the mobile device from remotely commanding the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
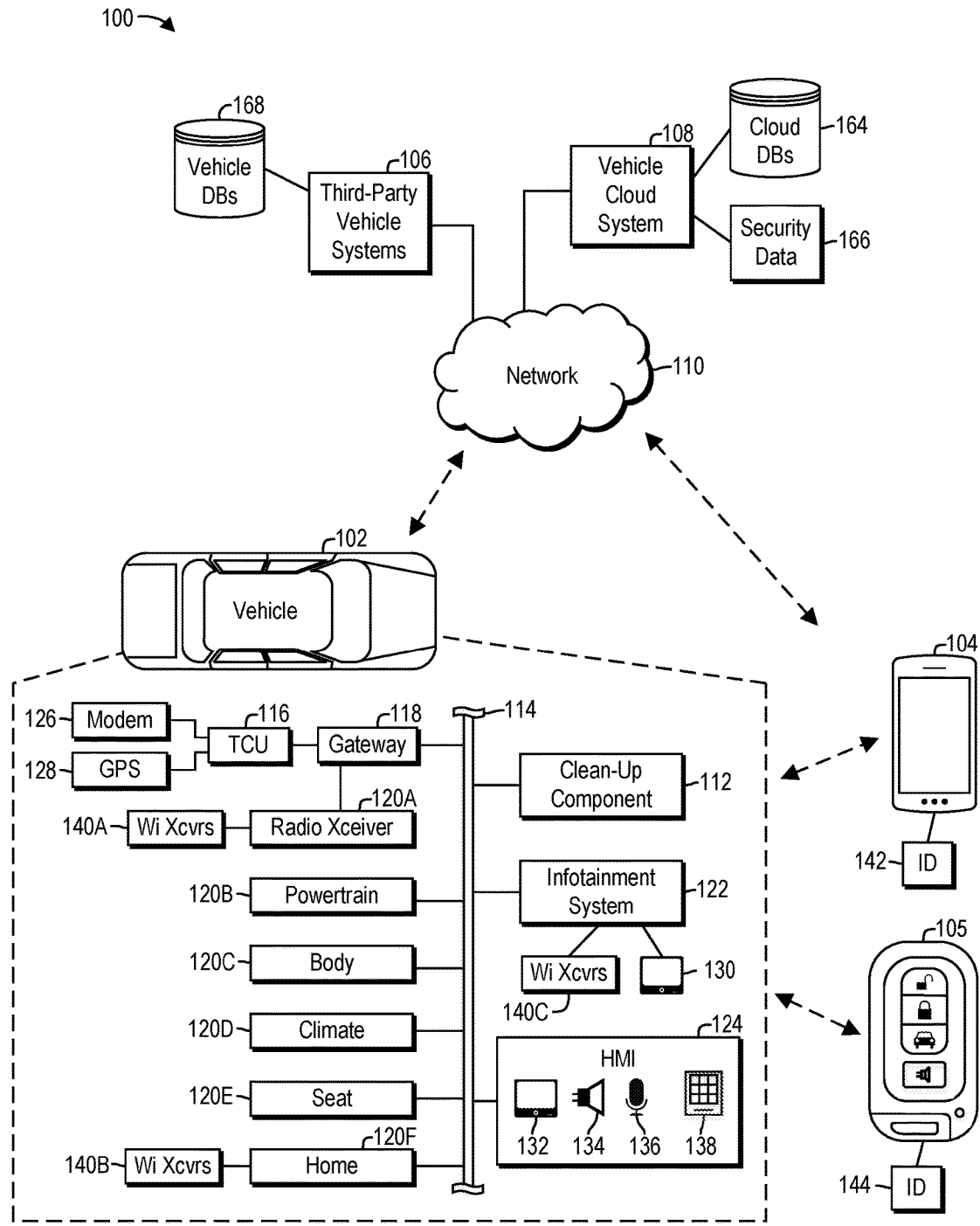
FIG. 1 is a schematic diagram of an exemplary system for managing vehicle security.

FIG. 1 illustrates an exemplary system 100 for managing vehicle security. The system 100 may include a vehicle 102 configured for remote services that enable a remote device, such as a mobile device 104, to control and track the location of the vehicle 102. Certain events, such as a transfer of the vehicle 102 from one owner to another, may create a security risk in which a mobile device 104 previously registered with the vehicle is still able to connect with, control, and track the vehicle 102. Accordingly, the system 100 may be configured to detect such an event, such as from third-party Internet data. Responsive to detection of such an event, the system 100 may be configured to automatically deauthorize previously authorized mobile devices 104 from connecting with, controlling, and tracking the vehicle 102, and to clear the vehicle 102 of data specific to previous users, to both secure the vehicle 102 and protect the previous users' privacy. These and other features are discussed in more detail below.

The system 100 may include one or more of the vehicle 102, the mobile device 104, a key fob 105, one or more third-party vehicle systems 106, and a vehicle cloud system 108. Each of these system 100 components may communicate with one or more of the other components directly and/or over the network 110. The network 110 may include one or more interconnected communication networks, such as one or more of the Internet, a cable television distribution network, a satellite link network, a local area network, a wide area network, and a telephone network.

The vehicle 102 may include various types of automobile, crossover utility vehicle (CUV), sport utility vehicle (SUV), truck, recreational vehicle (RV), boat, plane, E-bike, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). The vehicle 102 may also be an autonomous vehicle (AV). As the type and configuration of vehicle 102 may vary, the capabilities of the vehicle 102 may correspondingly vary. For example, different vehicles 102 may have different capabilities with respect to passenger capacity, towing ability and capacity, and storage volume. For title, inventory, and other purposes, the vehicle 102 may be associated with and include thereon a unique identifier, such as a Vehicle Identification Number ("VIN").

The vehicle 102 may include a clean-up component 112 configured to perform instructions, commands, and other routines in support of the processes described herein. For example, the clean-up component 112 may be configured to automatically clear user data from the vehicle 102 responsive to receiving a clean-up signal from the vehicle cloud system 108, which may correspondingly cause the vehicle 102 to deauthorize mobile devices 104 previously registered for automatic connection with and control of the vehicle 102.

The clean-up component 112 may be configured to communicate with other vehicle 102 components via one or more in-vehicle networks 114. The in-vehicle networks 114 may include one or more of a vehicle controller area network ("CAN"), an Ethernet network, and a media oriented system transfer ("MOST") network. The other vehicle 102 components with which the clean-up component 112 may communicate may include one or more of a telematics control unit ("TCU") 116, an electronic gateway unit 118, various electronic control units ("ECUs") 120, an infotainment system 122, and a human machine interface ("HMI") 124.

The TCU 116 of the vehicle 102 may be configured to facilitate wireless communication between the other vehicle 102 components and other devices and systems of the system 100 over the network 110. To this end, the TCU 116 may include an embedded cellular modem 126 or other wireless network transceiver (e.g., Wi-Fi transceiver) configured to connect to the network 110, such as over a cellular network to which the cellular modem 126 is subscribed. The other vehicle 102 components may access the communication capabilities of the TCU 116, and thus communicate with other components of the system 100, over the in-vehicle networks 114 and/or the gateway unit 118.

The TCU 116 may also include a global positioning system ("GPS") module 128 configured to identify vehicle 102 geographical data, such as via communicating with one or more satellites over a satellite link network. The vehicle 102 geographical data may include a current location and bearing of the vehicle 102. The TCU 116 may be configured to provide the vehicle 102 geographical data to the other vehicle 102 components, such as the infotainment system 122, and/or to other system 100 components, such as the vehicle cloud system 108, automatically or on request.

The vehicle ECUs 120 may be configured to monitor and manage various functions of the vehicle 102 under the power of the vehicle 102 battery and/or drivetrain. The vehicle ECUs 120 may include, but are not limited to, a radio transceiver controller 120A configured to communicate with mobile devices 104, key fobs 105, and other local vehicle 102 devices; a powertrain controller 120B configured to monitor and manage engine operating components; a body controller 120C configured to monitor and manage various power control functions such as exterior lighting, interior lighting, keyless entry, remote start, and point of access status verification; a climate management controller 120D configured to monitor and manage heating and cooling system components (e.g., compressor clutch, blower fan, temperature sensors); a seat controller 120E configured to monitor and manage seating components, including implementation of stored seat positions and adjustments; and a home device controller 120F configured to wirelessly communicate with and operate home devices such as garages, gates, smart lights, and smart locks.

The gateway unit 118 may be operatively coupled to and located in between the TCU 116 and the one or more in-vehicle networks 114, and may be configured to authenticate data received by the TCU 116 via the network 110 before the data is passed to the one or more in-vehicle networks 114. Similarly, the gateway unit 118 may be operatively coupled to and located in between the radio transceiver controller 120A and the one or more in-vehicle networks 114, and may be configured to authenticate data received by the radio transceiver controller 120A before the data is passed to the one or more in-vehicle networks 114. For example, the TCU 116 or the radio transceiver controller 120A may receive a remote command for the vehicle 102 initiated from the mobile device 104 that, if processed by the vehicle 102, would result in operation of the vehicle 102 (e.g., unlocking, locking, remote start). The gateway unit 118 may be configured to authenticate the command to ensure that it is legitimate and not an attempt to improperly gain access to the vehicle 102 before the command is further processed.

The gateway unit 118 may also include a separate connection to each in-vehicle network 114, and may thereby be configured to perform a routing function relative to data received by the TCU 116 and the radio transceiver controller 120A. Specifically, the gateway unit 118 may be configured to forward data to one or more vehicle 102 components while preventing the data from reaching one or more other vehicle 102 components, which may insulate one or more of the vehicle 102 components from receiving undesired data and may save vehicle 102 component resources from having to determine if non-relevant data is relevant to the component. For example, the vehicle ECUs 120 (possible other than the radio transceiver controller 120A) may be on one in-vehicle network 114, and the infotainment system 122, the HMI 124, and/or the clean-up component 112 may be on another in-vehicle network 114. In this case, responsive to receiving authenticated data for the clean-up component 112 or for the infotainment system 122, the gateway unit 118 may be configured to route the data to the network including the intended component and avoid the network including the non-intended components (e.g., the vehicle ECUs 120).

The infotainment system 122 may be configured to provide entertainment and information services to a user, such as via a graphical user interface ("GUI") shown on a display 130 coupled to and driven by the infotainment system 122. For example, the infotainment system 122 may be configured to provide in-vehicle services such as navigation, radio, playing music from a connected mobile device 104, in-vehicle apps based on Internet content retrieved via a connected mobile device 104 or via the TCU 116, hands-free calling, and voice command recognition. The infotainment system 122 may also facilitate connections with local mobile devices 104, such as via wireless transceivers 140C of the infotainment system 122. The infotainment system 122 may also enable users to view operational data relating to the vehicle 102, to customize operation of the vehicle 102, and to interact with the other vehicle 102 components. Users may interact with these services via the GUI shown on the display 130, which may be a touch screen display that enables users to submit commands to and through the infotainment system 122.

The HMI 124 may facilitate occupant interaction with one or more the other vehicle 102 components. The HMI 124 may include one or more video and alphanumeric displays 132, a speaker system 134, and any other suitable audio and visual indicators capable of providing data from the other vehicle 102 components to the user. The HMI 124 may also include a microphone 136 and physical controls 138, which may include an alphanumeric keyboard, a pointing device (e.g., mouse), keypads, pushbuttons, and control knobs, that are capable of accepting commands or input from a user to invoke functions of the other vehicle 102 components. As an example, the physical controls 138 may include steering wheel audio buttons, a push-to-talk button, instrument panel controls, and the like. The displays 132 may also include a touch screen mechanism for receiving user input.

One or more of the vehicle 102 components, such as one or more of the vehicle ECUs 120 and the infotainment system 122, may each be operatively coupled to one or more wireless transceivers 140. The wireless transceivers 140 may be configured to facilitate direct communication with other devices and systems, such as when such devices and systems are local to (e.g., within wireless communication range of) the wireless transceivers 230. For example, the wireless transceivers 140A of the radio transceiver controller 120A may be configured to directly connect and communicate with a corresponding wireless transceiver 230 (FIG. 2) of the mobile device 104 and the key fob 105. The wireless transceivers 140 and the wireless transceivers 230 may be configured to communicate via RF transmissions and may each include, without limitation, one or more of a Bluetooth transceiver, a ZigBee transceiver, a Wi-Fi transceiver, a radio-frequency identification ("RFID") transceiver, a near-field communication ("NFC") transceiver, and a transceiver designed for another RF protocol particular to a remote service provided by the vehicle 102.

As an example, responsive to a user interaction with the mobile device 104 or the key fob 105, the mobile device 104 or key fob 105, respectively, may be configured to directly and wirelessly transmit a command request to the radio transceiver controller 120A via the wireless transceivers 140A. The command request may indicate a desired action for the vehicle 102, such as an unlock request, a trunk open request, a lock request, a remote start request, or a panic request. The command request may also include an ID 142 or an ID 144 stored in the mobile device 104 or the key fob 105, respectively. The ID 142 and the ID 144 may each be an alphanumeric code, and may be encrypted.

The vehicle 102 may be configured to receive and process the command request when the vehicle 102 is in an off state or in an on state. Responsive to receiving the command request, the radio transceiver controller 120A may be configured to transmit the command data (e.g., the desired action and the ID 142 or the ID 144) to the gateway unit 118, which may be configured to responsively determine whether the mobile device 104 or the key fob 105 is authorized to make the command. If so, then the gateway unit 118 may be configured route the command to the vehicle 102 component configured to implement the command. For example, if the command is an unlock request, the gateway unit 118 may be configured to route the command to the body controller 120C, which may be configured to responsively unlock the vehicle 102. If the command if a remote start request, the gateway unit 118 may be configured to transmit the command to the powertrain controller 120B, which may be configured to responsively start the vehicle 102 engine.

As a further example, the wireless transceivers 140A may include several wireless transceivers arranged around the vehicle 102, such as near vehicle 102 access points (e.g., trunk release, door handle, engine start button). Each of these wireless transceivers may be associated with the nearby access point. When the mobile device 104 or the key fob 105 comes into communication range of one of these wireless transceivers, the mobile device 104 or the key fob 105 may be configured to automatically transmit its ID 142 or ID 144, respectively, to the radio transceiver controller 120A via the in-range wireless transceiver.

Responsive to receiving the ID 142 or the ID 144, the radio transceiver controller 120A may be configured to transmit the ID 142 or the ID 144 to the gateway unit 118, which may be configured to responsively determine whether the ID 142 or the ID 144 is authorized. If so, then the gateway unit 118 may be configured to enable the access point associated with the receiving wireless transceiver, such as by transmitting an enablement signal to the appropriate vehicle 102 component for the associated access point, at least until the ID 142 or the ID 144 ceases to be received via the associated wireless transceiver.

For example, if the ID 142 or the ID 144 is received via a wireless transceiver associated with a given vehicle 102 door handle, then the gateway unit 118 may be configured to cause the body controller 120C to unlock the vehicle 102 upon a user interaction with the door handle, such as by sending an enablement signal to the body controller 120C. As another example, if the ID 142 or the ID 144 is received by a wireless transceiver associated with a vehicle 102 start button, then the gateway unit 118 may be configured to cause the powertrain controller 120B to start the vehicle 102 upon interaction with the start button, such as by sending an enablement signal to the powertrain controller 120B. In some embodiments, the radio transceiver controller 120A and/or the gateway unit 118 may also be configured such that the strength of the wireless signal carrying the ID 142 or the ID 144 has to be greater than or equal to a predefined threshold to enable access to the associated access point.

As another example, a user may interact with the HMI 124 or the display 130 to submit an operation command for a home device to the home device controller 120F. Responsive to receiving the operation command, the home device controller 120F may be configured to cause the wireless transceivers 140B to transmit an RF signal that includes a preprogrammed code for operating the home device. For example, the home device may be a garage, and the transmitted RF signal may include a preprogrammed code that, upon reception by the garage, causes the garage to operate (e.g., open, close).

As a further example, the wireless transceivers 140C of the infotainment system 122 may be configured to directly connect and communicate with a corresponding wireless transceiver 230 of the mobile device 104, and may thereby exchange data with the mobile device 104 to provide services based on data from the mobile device 104. Such services may include, without limitation, hands-free telephone calling, music streaming, and in-vehicle applications reliant on content from the mobile device 104. Moreover, in some embodiments, rather than communicating over the network 110 via the cellular modem 126 of the TCU 116, the vehicle 102 components may be configured to communicate with other devices and systems of the system 100 over the network 110 via a local wireless connection formed between the vehicle 102 wireless transceivers 140C and the mobile device 104 wireless transceivers 230, and via the network 110 connection of the mobile device 104.

The mobile device 104 may be a mobile phone, tablet, desktop, laptop, or any like personal computing device. In addition or alternatively to controlling the vehicle 102 via direct wireless communications, the mobile device 104 may be configured to command the vehicle 102 over the network 110. In particular, responsive to receiving a user interaction indicating a cloud command request for the vehicle 102, the mobile device 104 may be configured to transmit the cloud command request to the vehicle cloud system 108 over the network 110, such as via a cellular modem 226 (FIG. 2) or a wireless transceiver 230 of the mobile device 104. The cloud command request may include the ID 142 of the mobile device 104, an identifier, such as a VIN, unique to the vehicle 102, and a requested command, such as unlocking or locking the vehicle 102, opening a trunk of the vehicle 102, starting the vehicle 102, changing a climate condition of the vehicle 102, or providing a current location of the vehicle 102.

The vehicle cloud system 108, which may include one or more servers, may be configured to provide a cloud service in which cloud command requests from authorized mobile devices 104 are forwarded to the vehicle 102 for implementation. Thus, responsive to receiving the cloud command request, the vehicle cloud system 108 may be configured to determine whether the mobile device 104 that transmitted the request is authorized to remotely command the vehicle 102. To this end, the vehicle cloud system 108 may be configured to query one or more cloud databases 164 based on the received ID 142 and the vehicle identifier of the cloud command request. The cloud databases 164 may include one or more records indicating one or more vehicle identifiers and, for each vehicle identifier, one or more mobile device 104 IDs authorized to command the vehicle associated with the vehicle identifier.

If the ID 142 of the cloud command request is not authorized to command the vehicle 102 according to the cloud databases 164, then the vehicle cloud system 108 may be configured to reject the request and transmit a rejection signal to the mobile device 104 via the network 110. Alternatively, if the ID 142 is authorized, then the vehicle cloud system 108 may be configured to transmit the requested command to the vehicle 102 over the network 110, such as via the cellular modem 126 of the TCU 116. Responsive to receiving the requested command, the vehicle 102 may be configured to execute the command, possibly subject to an authentication of the signal carrying the command by the gateway unit 118.

For example, if the requested command is an unlock request, then the TCU 116 may be configured transmit the command over the in-vehicle networks 114 to the body controller 120C, which may be configured to responsively unlock the vehicle 102. As a further example, if the requested command is a tracking command, the TCU 116 may be configured to capture geographical data, such as via the GPS module 128 of the TCU 116, and may be configured to transmit the geographical data to the vehicle cloud system 108 via the network 110. Responsive to receiving the geographical data, the vehicle cloud system 108 may be configured to transmit the geographical data over the network 110 to the mobile device 104, which may be configured to responsively display the geographical data of the vehicle 102, such as on a map.

In some embodiments, prior to the vehicle 102 executing the request command, the TCU 116 may be configured to transmit command data to the gateway unit 118 for authentication. The command data may include the requested command and security data 166 transmitted from the vehicle cloud system 108 with the requested command. The gateway unit 118 may be configured to authenticate the command by comparing the security data 166 with authentication data stored on the gateway unit 118. If the security data 166 matches the authentication data, then the gateway unit 118 may denote the command data as authentic. Responsive to the command being authenticated, the gateway unit 118 may be configured to transmit a command signal to the appropriate vehicle 102 component (e.g., to the TCU 116, to the body controller 120C), which may be configured to responsively execute the command. They gateway unit 118 may also be configured to determine whether the signal carrying the command from the vehicle cloud system 108 is stronger than a predetermined threshold to determine if the command is authentic.

The third-party vehicle systems 106, which may include one or more servers maintained by one or more third parties differing from the party responsible for manufacturing the vehicle 102 and/or maintaining the vehicle cloud system 108, may be third-party Internet sources for data indicative of security risks relating to the vehicle 102. Specifically, the third-party vehicle systems 106 may be configured to collect and manage data about vehicles as they are operated after manufacture, and may maintain one or more vehicle databases 168 that include the collected data. More particularly, the vehicle databases 168 may include one or more records indicating VINs particular to specific vehicles and data associated with operation of the vehicles after manufacture. The data may include a chain of ownership for the vehicle, information about owners and/or drivers of the vehicle such as sex, age, location, and driving history, a maintenance history of the vehicle, and an accident history for the vehicle 102. As explained herein, a transfer of ownership of the vehicle 102, which the third-party vehicle systems 106 may be configured to record in the vehicle databases 168 in connection with the vehicle 102, may be indicative of a security risk associated with the vehicle 102. As some non-limiting examples, the servers of the third-party vehicle systems 106 and vehicle databases 168 may be maintained by various departments of motor vehicles ("DMVs") and/or CARFAX.

Figure 2:
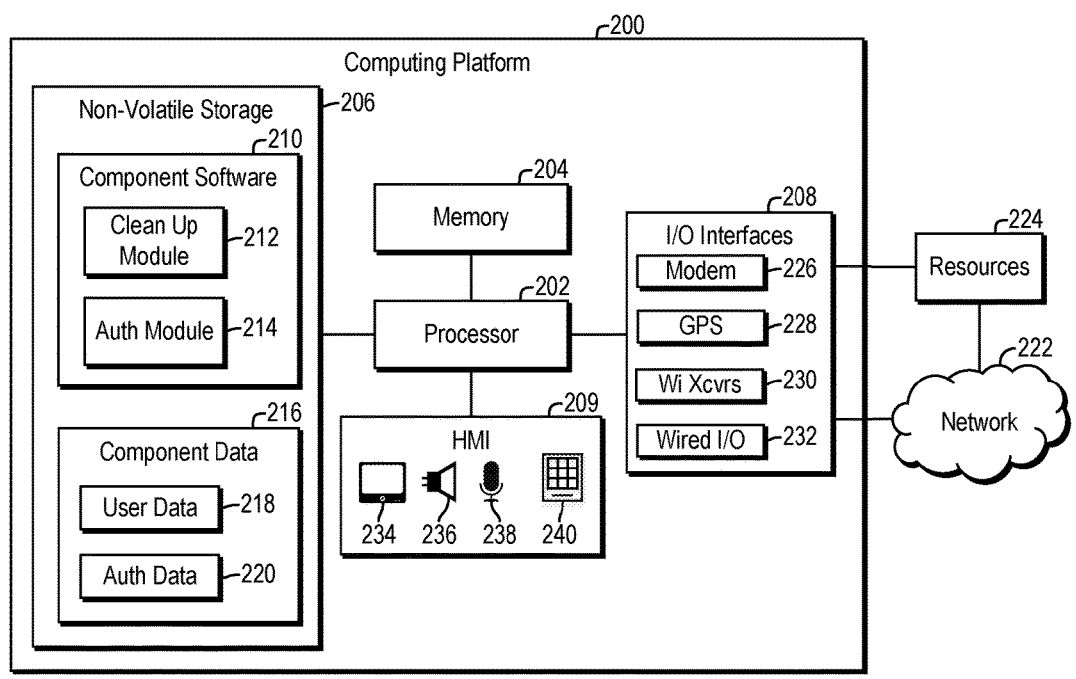
FIG. 2 is a schematic diagram of a computing platform that may be utilized in the exemplary system of FIG. 1.

Referring to FIG. 2, the vehicle 102 components and the other system 100 components may each be implemented by one or more computing platforms, such as the computing platform 200. A given computing platform 200 of the system 100 may include a processor 202, memory 204, non-volatile storage 206, I/O interfaces 208, and an HMI 209. The processor 202 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 204. The memory 204 may include a single memory device or a plurality of memory devices including, but not limited, random access memory ("RAM"), volatile memory, non-volatile memory, static random access memory ("SRAM"), dynamic random access memory ("DRAM"), flash memory, cache memory, or any other device capable of storing information. The non-volatile storage 206 may include one or more persistent data storage devices such as a hard drive, optical drive, tape drive, non-volatile solid state device, or any other device capable of persistently storing information.

The processor 202 may be configured to read into memory 204 and execute computer-executable instructions embodied as component software 210 residing in the non-volatile storage 206. The component software 210 of a given computing platform 200, upon execution by the processor 202 of the given computing platform 200, may be configured to cause the given computing platform 200 to implement the functions, features, and processes of the vehicle 102 component or the system 100 component being implemented by the given computing platform 200. For example, the infotainment system 122 may include component software 210 that upon execution is configured to implement in-vehicle features such as navigation, radio, streaming music from a connected mobile device 104, in-vehicle apps based on content from a connected mobile device 104, voice commands, and hands-free telephone calling. The component software 210 of a given computing platform 200 may include an operating system and/or one or more applications. The computer-executable instructions of the component software 210 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The component software 210 of a given computing platform 200 may be configured upon execution to cause the given computing platform 200 to implement one or more modules, such as a clean-up module 212 and/or an authentication module 214. Each module may represent a process being executed by the given computing platform 200. The clean-up module 212, which may be implemented by a computing platform 200 of the clean-up component 112 and/or of one or more of the other vehicle 102 components, may be configured to clear user data from the vehicle 102 responsive to a security risk being identified by the vehicle cloud system 108. The authentication module 214, which may be implemented by a computing platform 200 of the gateway unit 118, may be configured to authenticate and route data received by the TCU 116 and/or the radio transceiver 102A from an external source, such as the mobile device 104 or the vehicle cloud system 108.

The I/O interfaces 208 may provide one or more machine interfaces that operatively couple a computing platform 200 to other devices and systems, such as a network 222 or external resources 224. The network 222 may include the one or more in-vehicle networks 114 and/or the network 110, and the external resources 224 may include the computing platform 200 of another system 100 component or the computing platform 200 of another vehicle 102 component. The component software 210 of a given computing platform 200 may work cooperatively with the network 222 and the external resources 224 by communicating via the I/O interfaces 208 to provide the various features, functions, applications, processes, and modules described herein. The component software 210 may have program code that is executed by the external resources 224, or otherwise rely on functions or signals provided by other system or network components external to the computing platform 200.

The I/O interfaces 208 may include a cellular modem 226, which may include the cellular modem 126 of the TCU 116 or may be configured similar to the cellular modem 126 (e.g., configured to connect to the network 110 over a cellular network to which the cellular modem 226 is subscribed). The I/O interfaces 208 may also include a GPS module 228, which may include the GPS module 128 of the TCU 116 or may be configured similar to the GPS module 128 (e.g., configured to identify geographical data of the computing platform 200, such as via communicating with one or more satellites over a satellite link network). The I/O interfaces 208 may also include the wireless transceivers 230, which may include the wireless transceivers 140 of the vehicle 102. The I/O interfaces 208 may further include one or more wired I/O interfaces 232, which may include, without limitation, one or more of an ethernet interface, a CAN interface, and a MOST interface. In addition, the wired I/O interfaces 232, such as of the infotainment system 122 and the mobile device 104, may include one or more of a universal serial bus ("USB") interface and an auxiliary ("AUX") interface to facilitate wired connections between the infotainment system 122 and the mobile device 104.

The HMI 209 of a given computing platform 200 may include the HMI 124 of the vehicle 102, or may facilitate user interaction with the vehicle 102 component or system 100 component being implemented by the given computing platform 200. The HMI 209 may be configured similarly to the HMI 124, and may thus include one or more video and alphanumeric displays 234, a speaker system 236, and any other suitable audio and visual indicators capable of providing data from the vehicle 102 component or the system 100 component to the user. The HMI 209 may likewise include a microphone 238 and physical controls 240, which may include an alphanumeric keyboard, a pointing device (e.g., mouse), keypads, pushbuttons, and control knobs, that are capable of accepting commands or input from a user to invoke functions of the vehicle 102 component or the system 100 component. The displays 234 may also include a touch screen mechanism for receiving user input.

The non-volatile storage 206 of a given computing platform 200 may also include component data 216 utilized by the component software 210 of the given computing platform 200 to provide the functions and features of the component that are described herein. The component data 216 may include one or more databases. The component data 216 for the third-party vehicle systems 106 may include the vehicle databases 168, the component data 216 for the vehicle cloud system 108 may include the cloud databases 164 and the security data 166, the component data 216 for the mobile device 104 may include the ID 142, and the component data 216 for the key fob 105 may include the ID 144.

The component data 216 of a given computing platform 200 may likewise include user data 218. The user data 218 may include data specific to one or more vehicle 102 users, and may thus enable the provision of features by the vehicle 102 that are customized to specific users. For example, the component data 216 for the vehicle cloud system 108 may include the cloud databases 164, which may include permissions for user mobile devices, such as the mobile device 104, to remotely command the vehicle 102.

The user data 218, such as for the infotainment system 122, may store a user's personal data, such as his or her phone book, favorite or recurring navigation locations, and subscription information for the user's in-vehicle applications and services (e.g., music application, navigation application, satellite radio, informational applications for gas, weather, and reviews). The user data 218, such as for the infotainment system 122, may also include configuration settings set up by a user for the vehicle 102. As some non-limiting examples, the vehicle 102 configuration settings may include GUI configuration settings, headlight settings, and convenience settings.

The user data 218, such as for the infotainment system 122, the gateway unit 118, and the vehicle cloud system 108, may also include authorized mobile device data. In the case of the vehicle cloud system 108, the authorized mobile device data may be represented by the mobile device permissions included in the cloud databases 164. The authorized mobile device data may include information enabling one or more mobile devices 104 to command the vehicle 102, such as directly via the radio transceiver controller 120A or via the vehicle cloud system 108, and to connect to the infotainment system 122, such as via Bluetooth or Wi-Fi.

For example, the first time a mobile device 104 attempts to form a connection with the infotainment system 122 via the wireless transceivers 140C, such as via Bluetooth, a user may need to perform a manual pairing operation via the GUI shown on the display 130. During the pairing process, the mobile device 104 may be configured to transmit its ID 142 to the infotainment system 122 via the mobile device wireless transceivers 230 and the infotainment system 122 wireless transceivers 140C. Responsive to a successful pairing, the infotainment system 122 may be configured to store the ID 142 for the mobile device 104 in the authorized mobile device data of the infotainment system 122. Responsive to subsequent connection attempts by the mobile device 104, which may automatically occur responsive to a vehicle power-on event, the infotainment system 122 may be configured to automatically connect to the mobile device 104 based on receiving the ID 142 from the mobile device 104 and locating the ID 142 in the authorized mobile device data of the infotainment system 122.

As a further example, the authorized mobile device data of the infotainment system 122 may include Wi-Fi access credentials, which a mobile device 104 may utilize to connect to a Wi-Fi wireless transceiver 140C of the infotainment system 122 and thereby access the Internet via the vehicle's 102 Internet connection. Specifically, a user may interact with the GUI provided by the infotainment system 122 to create Wi-Fi settings, which may include an SSID and/or a password, for connecting to the Wi-Fi wireless transceiver 140C of the infotainment system 122. The access credentials may also include an identifier for each mobile device 104 allowed to connect to the infotainment system 122 via Wi-Fi, such as the ID 142. Thereafter, a mobile device 104 may request a connection to the vehicle 102 Wi-Fi wireless transceiver 140C by transmitting a connection request thereto that includes the access credentials. Responsive to receiving the connection request, the infotainment system 122 may be configured to determine whether the access credentials of the connection request match those of the authorized mobile device data. If so, then the infotainment system 122 may be configured to accept the connection to the Wi-Fi wireless transceiver 140C by the mobile device 104.

As another example, responsive to receiving a direct command request at the radio transceiver controller 120A or a cloud command request at the vehicle cloud system 108, the gateway unit 118 or the vehicle cloud system 108 may be configured to respectively determine whether the command is authorized based on the authorized mobile device data of the respective component. A user may submit mobile device permissions to the authorized mobile device data of these components via the GUI displayed by the infotainment system 122 and/or via a GUI shown on a display 234 of the mobile device 104. The submitted permissions may include the IDs 142 of the permitted mobile devices 104, which the gateway unit 118 or the vehicle cloud system 108 may compare to IDs included in the received command request to determine if the command request is authorized. Responsive to receiving new permissions for the vehicle cloud system 108, both the mobile device 104 and the infotainment system 122 may be configured to transmit the permissions to the vehicle cloud system 108 over the network 110 for inclusion in the authorized mobile device data of the vehicle cloud system 108.

The user data 218, such as for the home device controller 120F, may also include programmed home device data that enables the vehicle 102 to wirelessly operate RF-capable home devices outside of the vehicle 102, such as a garage, gate, lights, and locks. For example, a user may interact with the HMI 124 to program home device data, such as garage data, into the user data 218 of the home device controller 120F. The stored programmed home device data may include an authorized code for operating a home device. Thereafter, responsive to receiving a command to operate the home device via the HMI 124, the home device controller 120F may be configured to operate the home device by transmitting, such as via a wireless transceiver 140B coupled to the home device controller 120F, an RF signal including the code for the home device that is included in the programmed home device data.

The user data 218, such as for the seat controller 120E, may also include seat configuration data containing a customized seat position for each of one or more users. The customized seat position for each user may be set and stored via the HMI 124 or the display 130. Responsive to a vehicle power-on event after a customized seat position is stored, the seat controller 120E may be configured to automatically adjust a seat, such as the driver seat, to the customized position based on the seat configuration data. Such adjustment may occur each time the vehicle 102 is powered on (assuming the seat isn't already in the customized position), or may occur responsive to receiving an identifier associated with a customized seat position of the seat configuration data. The identifier may be submitted to the seat controller 120E via a user selection using the HMI 124 or the display 130, or in the form of the ID 142 or the ID 144 transmitted from the mobile device 104 or the key fob 105, respectively, when used to power on or unlock the vehicle 102.

Any of the user data 218 stored on the vehicle 102 may be transmitted to the vehicle cloud system 108, such as via the network 110, and may be stored in the user data 218 of the vehicle cloud system 108, such as in the cloud databases 164, in association with the vehicle 102. This data may be restored to the vehicle 102 user data 218 on user request, such as via the display 130 or the HMI 124.

The infotainment system 122 and/or the mobile device 104 may each be configured to display the user data 218 of the vehicle 102 and/or of the vehicle cloud system 108, such as via a GUI shown on the display 130 of the vehicle 102 or via a GUI shown on a display 234 of the mobile device 104, for viewing and manipulation by a user. For instance, the GUI of the infotainment system 122 may be configured to present a user's phonebook when the user utilizes a hands-free telephone feature provided by the infotainment system 122 to enable calling a contact without typing in a number. The GUI of the infotainment system 122 may further be configured to present a user's favorite or recurring navigation locations when the user utilizes a navigation feature provided by the infotainment system 122. The GUI of the infotainment system 122, and of the mobile device 104, may also display options enabling a user to manipulate settings and permissions stored in the user data 218, such as described above.

Some aspects of the user data 218 may be personal to a particular vehicle 102 user, and other aspects of the user data 218 may enable a user to control or track the vehicle 102 via a mobile device 104. Accordingly, in the event of a security risk such as a transfer of the vehicle 102 from one owner to another, it may be in the best interest of both previous users and new users to erase previously stored personal user data and deauthorize previously authorized mobile devices 104. Accordingly, responsive to identifying a security risk for the vehicle 102, such as based on data collected by the third-party vehicle systems 106, the vehicle cloud system 108 may be configured to delete user data 218 associated with previous users of the vehicle 102 from the cloud databases 164, which may erase permissions for mobile devices 104 to control the vehicle 102 via the vehicle cloud system 108. The vehicle cloud system 108 may further be configured to instruct the vehicle 102 to remove user data 218 from the vehicle 102. In this way, previous users will not be able to improperly track and control the vehicle 102 via their mobile devices 104, and new users will not be able to access information personal to the previous users of the vehicle 102.

While an exemplary system 100 is shown in FIG. 1, the example is not intended to be limiting. Indeed, the system 100 may have more or fewer components, and alternative components and/or implementations may be used. For example, rather communicating over the in-vehicle networks 114, two or more vehicle 102 components may be directly connected. For example, the HMI 124 may be directly connected to one or more other vehicle 102 components, and may include HMI components specific for interacting with the directly connected vehicle 102 components. As a further example, the functions of two or more vehicle 102 components may be combined into a single component and may be implemented by a same computing platform 200 connected to the in-vehicle networks 114, and the functions of a vehicle 102 component may be spread across several components each implemented by a different computing platform 200. For example, the TCU 116, the gateway unit 118, and/or the clean-up component 112 may be combined into a single component, and the radio transceiver controller 120A, the gateway unit 118, and the clean-up component 112 may be combined into a single component.

Figure 3:
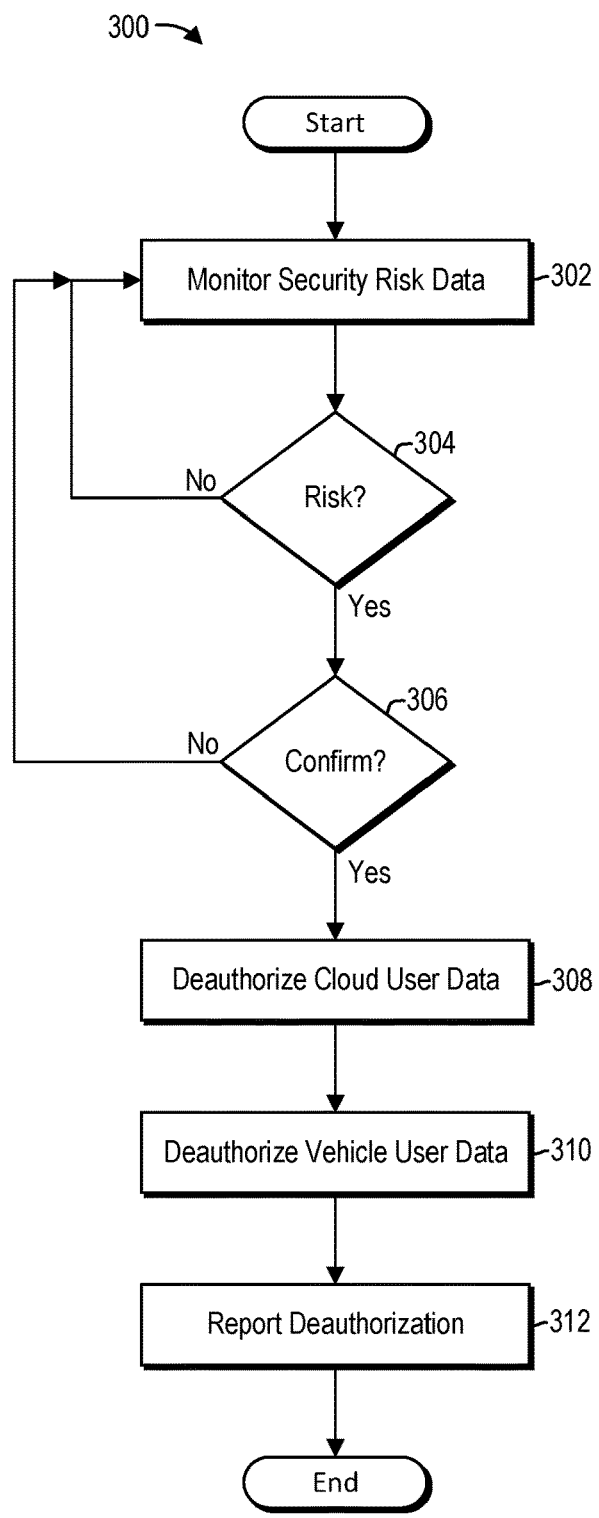
FIG. 3 is a flowchart of an exemplary process for managing vehicle security that may be performed by the exemplary system of FIG. 1.

FIG. 3 illustrates a process 300 that may be performed by the system 100 of FIG. 1 to manage security of a vehicle 102. In block 302, third-party Internet data may be monitored for security risks relating to one or more vehicles that includes the vehicle 102. In particular, the vehicle cloud system 108 may be configured to monitor data maintained by the third-party vehicle systems 106 within the vehicle databases 168 for indications of a security risk associated with one of the vehicles, such as a transfer of ownership of one of the vehicles. Each of the vehicles may be configured for remote services that enables control of the vehicle from a mobile device 104, such as via a cloud service provided by the vehicle cloud system 108. The process 300 may prevent previous users from controlling or tracking each of the one or more vehicles after a security risk for the vehicle is identified.

In some embodiments, the vehicle cloud system 108 may monitor the data of the third-party vehicle systems 106 by subscribing to the third-party vehicle systems 106 for notifications of security risk indicators relating to the one or more vehicles. Specifically, the vehicle cloud system 108 may be configured to send a subscription request to the third-party vehicle systems 106. The subscription request may include an identifier, such as a VIN, for each of the one or more vehicles. Responsive to receiving the subscription request, the third-party vehicle systems 106 may be configured to monitor the vehicle databases 168 for any indications of security risks, such as title transfers, sale events, new owners, and/or new drivers, relating to the provided identifiers. Responsive to identifying a security risk relating to one of the vehicle identifiers, the third-party vehicle systems 106 may be configured to transmit a notification of the security risk indicator to the vehicle cloud system 108. In alternative embodiments, the vehicle cloud system 108 may be configured to periodically query the third-party vehicle systems 106 for data indicative of a security risk relating to the one or more vehicles.

In block 304, a determination of whether a security risk exists in association with the vehicle 102 may be made based on the monitored third-party Internet data of the third-party vehicle systems 106. The vehicle cloud system 108 may be configured to identify whether the monitored third-party Internet data indicates a security risk for the vehicle 102 based on the periodic queries to the third-party vehicle systems 106, or based on receiving a security risk notification for the identifier of the vehicle 102 via the subscription.

Responsive to identifying a security risk based on the monitored third-party Internet data ("Yes" branch of block 304), in block 306, the security risk may be confirmed. Specifically, the vehicle cloud system 108 may be configured to transmit a message, such as a text message or a data push notification message, to a mobile device 104 previously registered for the vehicle 102, such as indicated in the cloud databases 164. Receipt of the message may cause the mobile device 104 to prompt for confirmation of the security risk. For example, responsive to receiving the message, the mobile device 104 may be configured to display a notification to a user asking for confirmation that the user recently transferred ownership of the vehicle 102. Responsive to receiving confirmation of the security risk, the mobile device 104 may be configured to transmit the confirmation to the vehicle cloud system 108 over the network 110.

Responsive to receiving the confirmation from the mobile device 104 ("Yes" branch of block 306), in block 308, the user data 218 associated with the vehicle 102 of the vehicle cloud system 108, such as within the cloud databases 164, may be deauthorized. Specifically, the vehicle cloud system 108 may delete the user data 218 associated with the vehicle 102, such as from the cloud databases 164, which correspondingly may deauthorize the mobile device 104 from remotely commanding the vehicle 102 via the vehicle cloud system 108. For example, the cloud databases 164 may associate the ID 142 of the mobile device 104 with the VIN of the vehicle 102 to authorize commands received in connection with the ID 142 and the vehicle 102. Responsive to receiving the confirmation, the vehicle cloud system 108 may be configured to remove the ID 142 from association with the vehicle 102, and to remove any other previously associated IDs. Thereafter, responsive to receiving a cloud command request for the vehicle 102 from the mobile device 104 that includes the ID 142, the vehicle cloud system 108 may determine that the ID 142 is not associated with the vehicle 102 within the cloud databases 164 and reject the request.

In block 310, a clean-up signal may be transmitted to the vehicle 102 that instructs the vehicle 102 to delete user data 218 previously stored on the vehicle 102. Specifically, the vehicle cloud system 108 may be configured to transmit the clean-up signal to the vehicle 102, such as via the embedded cellular modem 126 of the vehicle 102, over the network 110. Responsive to receiving the clean-up signal, the embedded cellular modem 126 may be configured to forward the signal to the clean-up component 112, which may be configured to responsively cause the other vehicle 102 components to remove user data 218 from their non-volatile storage 206, such as by sending a corresponding instruction to the other vehicle 102 components.

For example, responsive to the vehicle 102 receiving the clean-up signal, the infotainment system 122 may be configured to delete user data 218 stored in its non-volatile storage 206, which may include personal data of previous users and mobile device authorization data, and may correspondingly deauthorize the mobile device 104 from automatically connecting with the infotainment system 122 upon a vehicle power-on event. Responsive to a subsequent power-on event of the vehicle 102 after the clean-up signal is received and executed, and to receiving a connection request by the mobile device 104, the infotainment system 122 may be configured to prompt for permission to connect to the mobile device 104.

Further responsive to a subsequent power-on event of the vehicle 102 after the user data 218 is removed, the infotainment system 122 may be configured to perform an unpackaging process in which a new user may configure the infotainment system 122 to his or her preferences, such as by making selections via a GUI shown on the display 130. The unpackaging process may mirror the process that a user may traverse upon the vehicle 102 being turned on for the first time. For example, the GUI shown by infotainment system 122 may include a series of screens prompting for user input indicative of a language, home address, in-vehicle application subscription information, settings such as navigation preferences, and whether the user would like to pair a mobile device 104.

As a further example, responsive to the vehicle 102 receiving and executing the clean-up signal, the home device controller 120F may be configured to delete the home device data stored in its non-volatile storage 206. Accordingly, responsive to receiving a command to operate a home device after the clean-up signal is received and executed, the home device controller 120F may not contain the code for operating the home device, and consequently no operation of the home device may occur. In this way, the clean-up signal received by the vehicle 102 may prevent the vehicle 102 from wirelessly operating the home device.

As another example, responsive to the vehicle 102 receiving and executing the clean-up signal, the seat controller 120E may be configured to delete the customized seat position stored in the seat configuration data of its non-volatile storage 206, and replace it with a factory default seat position. Accordingly, responsive to a vehicle on event and/or to receiving a user input requesting movement of a seat, such as the driver's seat, according to the seat configuration data after the clean-up signal is received, the seat controller 120E may be configured to adjust the seat of the vehicle 102 to the factory default position based on the seat configuration data.

As an additional example, responsive to the vehicle 102 receiving and executing the clean-up signal, the radio transceiver controller 120A and/or the gateway unit 118 may be configured to delete authorized mobile device data from its non-volatile storage 206, which may correspondingly deauthorize the mobile device 104 and/or key fob 105 from directly and wirelessly controlling the vehicle 102. Alternatively, key fobs 105 may be protected from deauthorization, and the radio transceiver controller 120A and/or the gateway unit 118 may be configured to delete authorized mobile device data associated with previously registered mobile devices 104. Responsive to receiving a command directly from the mobile device 104 and/or key fob 105 after the vehicle 102 receives and executes the clean-up signal, the radio transceiver controller 120A and/or gateway unit 118 may be configured to reject the command.

In some embodiments, prior to executing a clean-up signal received from the vehicle cloud system 108, the vehicle 102 may be configured to authenticate the clean-up signal. In particular, the gateway unit 118 may be configured to authenticate the clean-up signal based on authentication data 220 stored in its non-volatile storage 206 and security data 166 inserted into the clean-up signal by the vehicle cloud system 108, such as by comparing the authentication data 220 with the security data 166 to determine if they match. In some embodiments, the vehicle cloud system 108 may be configured to encrypt the security data 166 using a public key encryption scheme. In other words, the vehicle cloud system 108 may be configured to encrypt the security data 166 via a public key, and responsive receiving the clean-up signal, the gateway unit 118 may be configured to decrypt the security data 166 using a private key. The gateway unit 118 may then be configured to compare the decrypted security data 166 with the authentication data 220 to determine if the security data 166 matches the authentication data 220. If so, then the gateway unit 118 may be configured to determine that the clean-up signal is authentic, and may proceed to execute the clean-up signal a signal, such as by transmitting a signal that causes the vehicle 102 components to clear the user data 218 from the vehicle 102.

In block 312, the deauthorization of user data 218 on the cloud and on the vehicle 102 may be reported to the mobile device 104. In particular, the vehicle cloud system 108 may be configured to transmit a message to the mobile device 104, such as a text message or a data message, over the network 110 indicative of the deauthorization. The mobile device 104 may be configured to responsively display an indication of the deauthorization, such as in a text message or as a push-notification.

At the end of the process 300, a mobile device 104 of a previous vehicle 102 owner may be unable to track and/or control the vehicle 102, both directly and via a cloud service provided by the vehicle cloud system 108. Moreover, personal data and settings of the previous owner may be removed from the vehicle 102, thereby preventing new owners from accessing and utilizing such data.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a server configured to
responsive to receiving a remote command for a vehicle from an authorized mobile device, transmit the command to the vehicle, the vehicle being configured to responsively execute the command; and
responsive to identifying a security risk for the vehicle based on monitored third-party Internet data after the command is executed, deauthorize the mobile device from remotely commanding the vehicle and transmit a clean-up signal to the vehicle, the vehicle being configured to responsively remove user data from the vehicle.

2. The system of claim 1, wherein the user data includes authorized mobile device data, and the vehicle is configured to
responsive to a vehicle power-on event before the clean-up signal is received, automatically connect to the mobile device based on the authorized mobile device data; and
responsive to a vehicle power-on event after the clean-up signal is received, prompt for permission to connect to the mobile device.

3. The system of claim 1, wherein the user data includes programmed garage data, and the vehicle is configured to, responsive to receiving a command to operate a garage before the clean-up signal is received, wirelessly operate the garage based on the programmed garage data, wherein the clean-up signal prevents the vehicle from wirelessly operating the garage.

4. The system of claim 1, wherein the user data comprises a customized seat position, and the vehicle is configured to
responsive to a vehicle power-on event before the clean-up signal is received, adjust a driver seat of the vehicle to the customized seat position based on the user data; and
responsive to a vehicle power-on event after the clean-up signal is received, adjust the driver seat of the vehicle to a default seat position.

5. The system of claim 1, wherein the vehicle is configured to, responsive to a vehicle power-on event after the clean-up signal is received, prompt for user input indicative of a language and a home address.

6. The system of claim 1, wherein the server is configured to, responsive to identifying the security risk, prior to transmitting the clean-up signal, transmit a message to the mobile device that causes the mobile device to prompt for confirmation of the security risk.

7. The system of claim 1, wherein the vehicle comprises:
a controller area network ("CAN");
a telematics control unit configured to wirelessly receive the clean-up signal from the server;
an electronic gateway between the telematics control unit and the CAN; and
a plurality of electronic control units storing the user data connected to the CAN,
wherein the electronic gateway is configured to, responsive to receiving the clean-up signal from the telematics control unit,
authenticate the clean-up signal via stored authentication data, and
responsive to authenticating the clean-up signal, transmit a corresponding signal onto the CAN that causes the electronic control units to clear the user data.

8. The system of claim 1, wherein the server is configured to periodically query a third-party Internet source for data indicative of the security risk.

9. A system comprising:
a vehicle configured to
responsive to a vehicle power-on event, automatically form a local wireless connection with a mobile device based on authorization data stored in the vehicle; and
responsive to receiving a clean-up signal from a server transmitted responsive to the server identifying a security risk associated with the vehicle based on monitored third-party Internet data, deauthorize automatic connection with the mobile device by clearing the authorization data.

10. The system of claim 9, wherein the vehicle comprises stored programmed garage data, and is configured to, responsive to receiving a command to operate a garage before the clean-up signal is received, wirelessly operate the garage based on the programmed garage data, wherein the clean-up signal prevents the vehicle from wirelessly operating the garage by clearing the programmed garage data.

11. The system of claim 9, wherein the vehicle includes a stored customized seat position, and is configured to
responsive to a vehicle power-on event before the clean-up signal is received, adjust a driver seat of the vehicle to the customized seat position; and
responsive to a vehicle power on event after the clean-up signal is received, adjust the driver seat of the vehicle to a default seat position.

12. The system of claim 9, wherein the vehicle is configured to
responsive to wirelessly receiving a command directly from the mobile device while the vehicle is in an off state before the clean-up signal is received, execute the command based on the authorization data; and
responsive to wirelessly receiving the command directly from the mobile device while the vehicle is in the off state after the clean-up signal is received, reject the command.

13. A method comprising:
by a server
subscribing to a third-party Internet source of security risk indicators for a plurality of vehicle identification numbers (VINs);
responsive to receiving a remote command for a vehicle including one of the VINs from an authorized mobile device, causing the vehicle to execute the command;
responsive to receiving a security risk indicator notification for the VIN via the subscription, deauthorizing the mobile device from remotely commanding the vehicle and transmitting a clean-up signal to the vehicle; and
by a vehicle
responsive to receiving the clean-up signal, removing user data from the vehicle.

14. The method of claim 13, wherein the user data includes authorized mobile device data, and further comprising:
responsive to a vehicle power-on event before the clean-up signal is received, automatically connecting, by the vehicle, to the mobile device based on the authorized mobile device data; and
responsive to a vehicle power-on event after the clean-up signal is received, prompting, by the vehicle, for permission to connect with the mobile device.

15. The method of claim 13, wherein the user data includes programmed garage data, and further comprising, responsive to receiving a command to operate a garage before the clean-up signal is received, wirelessly operating, by the vehicle, the garage based on the programmed garage data, wherein the clean-up signal prevents wireless operation of the garage by the vehicle.

16. The method of claim 13, wherein the user data comprises a customized seat position, and further comprising:
responsive to a vehicle power-on event before the clean-up signal is received, adjusting, by the vehicle, a driver seat to the customized seat position based on the user data; and
responsive to a vehicle power-on event after the clean-up signal is received, adjusting, by the vehicle, the driver seat to a default seat position.

17. The method of claim 13, further comprising, responsive to a power-on event after the clean-up signal is received, prompting, by the vehicle, for user input indicative of a language and a home address.

18. The method of claim 13, further comprising, responsive to receiving the security risk indicator notification, prior to transmitting the clean-up signal, transmitting, by the server, a message to the mobile device that causes the mobile device to prompt for confirmation of the security risk.

* * * * *